US011037263B2

(12) United States Patent
Li

(10) Patent No.: US 11,037,263 B2
(45) Date of Patent: Jun. 15, 2021

(54) SYSTEMS AND METHODS FOR DISPLAYING AN IDENTITY RELATING TO A SERVICE REQUEST

(71) Applicant: BEIJING DIDI INFINITY TECHNOLOGY AND DEVELOPMENT CO., LTD., Beijing (CN)

(72) Inventor: Qi Li, Beijing (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 243 days.

(21) Appl. No.: 15/910,781

(22) Filed: Mar. 2, 2018

(65) Prior Publication Data
US 2018/0189920 A1    Jul. 5, 2018

Related U.S. Application Data

(63) Continuation of application No. PCT/CN2016/112376, filed on Dec. 27, 2016.

(30) Foreign Application Priority Data

May 25, 2016  (CN) .......................... 201610356149.2

(51) Int. Cl.
  *G06Q 50/30* (2012.01)
  *G06Q 30/06* (2012.01)
  (Continued)

(52) U.S. Cl.
  CPC ........... *G06Q 50/30* (2013.01); *G06F 3/0482* (2013.01); *G06Q 30/0609* (2013.01); *G08G 1/202* (2013.01)

(58) Field of Classification Search
  CPC .. G06Q 50/30; G06Q 30/0609; G06F 3/0482; G08G 1/202
  (Continued)

(56) References Cited

U.S. PATENT DOCUMENTS 8,635,556 B2    1/2014 Lalancette et al.
9,910,438 B1 *  3/2018 Arden ..................... B60R 25/24
(Continued)

FOREIGN PATENT DOCUMENTS

CN      101355714 A    1/2009
CN      101662722 A    3/2010
(Continued)

OTHER PUBLICATIONS

Graphical User Interface Concepts Part 1. http://www.deitel.com/books/vcppnethtp1/vcpphtp1_12.pdf. (Year: 2004).*
(Continued)

*Primary Examiner* — George Chen
*Assistant Examiner* — Lisa Ma
(74) *Attorney, Agent, or Firm* — Metis IP LLC

(57) ABSTRACT

The present disclosure relates to systems and methods for directing a provider terminal corresponding to a provider of a transportation service to display an identity relating to a service request. The systems may perform the methods to obtain a target service request associated with a target transportation service from a target requestor; and direct a provider terminal corresponding to a provider of the target transportation service to display an identity relating to the target service request to assist the provider to identify the target requestor.

20 Claims, 10 Drawing Sheets

(51) Int. Cl.
*G08G 1/00* (2006.01)
*G06F 3/0482* (2013.01)

(58) Field of Classification Search
USPC .......................................................... 705/13
See application file for complete search history.

(56) References Cited

U.S. PATENT DOCUMENTS

| | | | |
|---|---|---|---|
| 2004/0076280 A1 | 4/2004 | Ando et al. | |
| 2006/0135134 A1 | 6/2006 | Mezhvinsky et al. | |
| 2009/0019385 A1* | 1/2009 | Khatib | G06F 3/04817 715/765 |
| 2013/0179205 A1* | 7/2013 | Slinin | G06Q 10/06 705/7.13 |
| 2014/0067491 A1 | 3/2014 | James et al. | |
| 2014/0325437 A1* | 10/2014 | Pacenta | G06F 3/04883 715/793 |
| 2015/0161564 A1* | 6/2015 | Sweeney | G06Q 50/30 705/338 |
| 2015/0161697 A1 | 6/2015 | Jones et al. | |
| 2015/0356703 A1* | 12/2015 | Ellis | G06Q 10/063118 705/7.17 |
| 2016/0019728 A1* | 1/2016 | Petrie | G06Q 50/30 705/5 |
| 2016/0027079 A1* | 1/2016 | Schoeffler | H04N 5/23293 705/325 |
| 2016/0132792 A1* | 5/2016 | Rosnow | G06F 3/0484 705/5 |
| 2017/0098224 A1* | 4/2017 | Marco | G06Q 50/30 |
| 2018/0189920 A1 | 7/2018 | Li | |

FOREIGN PATENT DOCUMENTS

| | | | |
|---|---|---|---|
| CN | 102426780 A | 4/2012 | |
| CN | 102479431 A | 5/2012 | |
| CN | 102592244 A | 7/2012 | |
| CN | 102637359 A | 8/2012 | |
| CN | 103208181 A | 7/2013 | |
| CN | 103391376 A | 11/2013 | |
| CN | 103903425 A | 7/2014 | |
| CN | 104135528 A | 11/2014 | |
| CN | 104598978 A | 5/2015 | |
| CN | 104732470 A | 6/2015 | |
| CN | 104809867 A | 7/2015 | |
| CN | 104900049 A | 9/2015 | |
| CN | 105225467 A | 1/2016 | |
| CN | 105279953 A | 1/2016 | |
| CN | 105551235 A | 5/2016 | |
| CN | 105575148 A | 5/2016 | |
| KR | 20130040430 A | 4/2013 | |
| TW | I528319 B | 4/2016 | |
| TW | I530891 B | 4/2016 | |
| WO | 2016078476 A1 | 5/2016 | |
| WO | 2016134638 A1 | 9/2016 | |
| WO | WO-2019003182 A1 * | 1/2019 | ......... G06Q 30/0282 |

OTHER PUBLICATIONS

William, David. "New Uber No Show Policy Requires Riders to Be Uber Fast". Published May 13, 2016. https://smallbiztrends.com/2016/05/uber-no-show-policy.html (Year: 2016).*

The Extended European Search Report for European Patent Application No. 16903003.8 dated Jan. 28, 2019, 6 pages.

International Search Report in PCT/CN2016/112376 dated Mar. 30, 2017, 5 pages.

Written Opinion in PCT/CN2016/112376 dated Mar. 30, 2017, 4 pages.

First Office Action in Chinese Application No. 201680081950.9 dated Jul. 3, 2020, 17 pages.

First Office Action in Chinese Application No. 201610356149.2 dated Mar. 2, 2020, 12 pages.

* cited by examiner

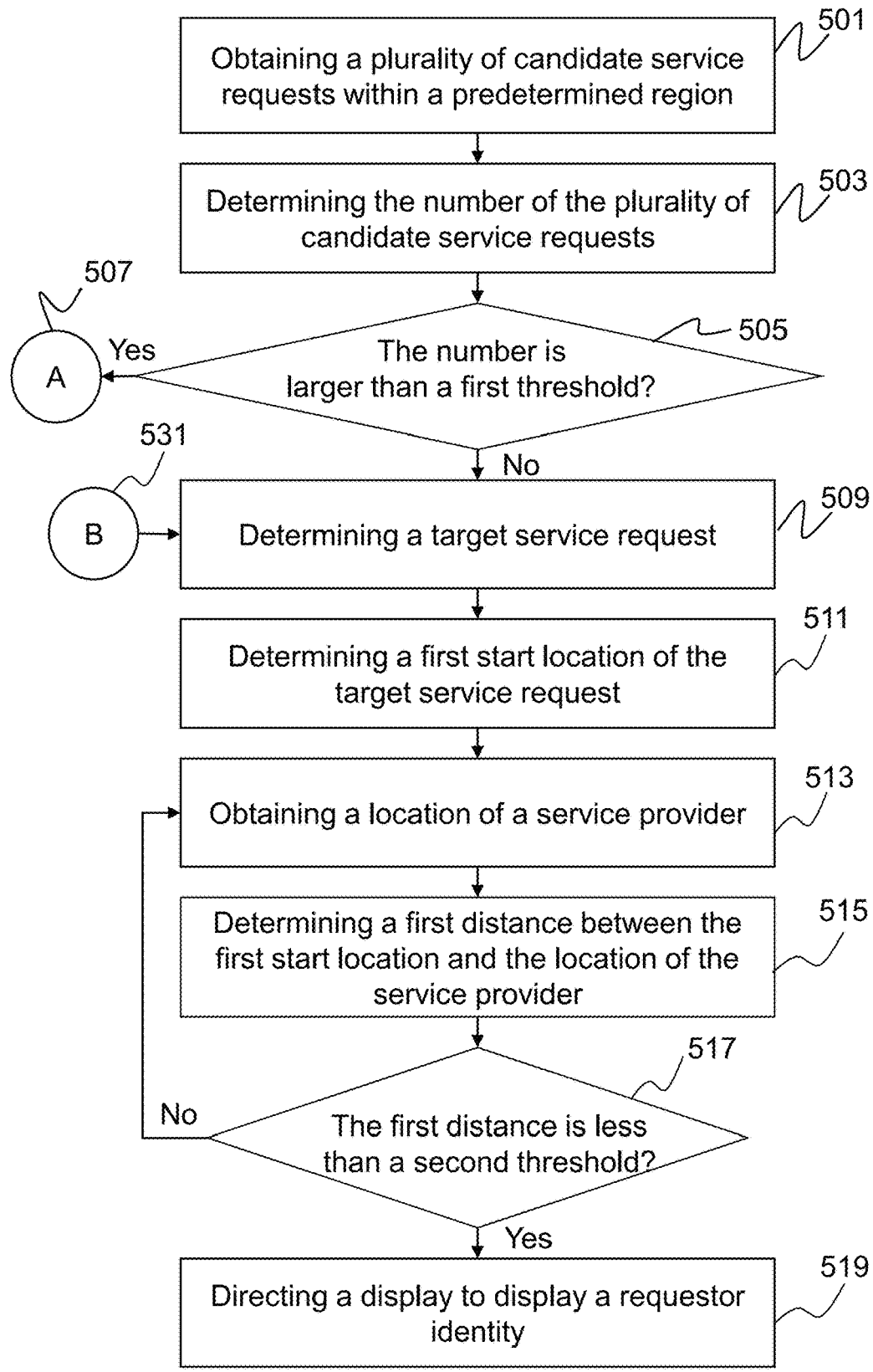
FIG. 5-A

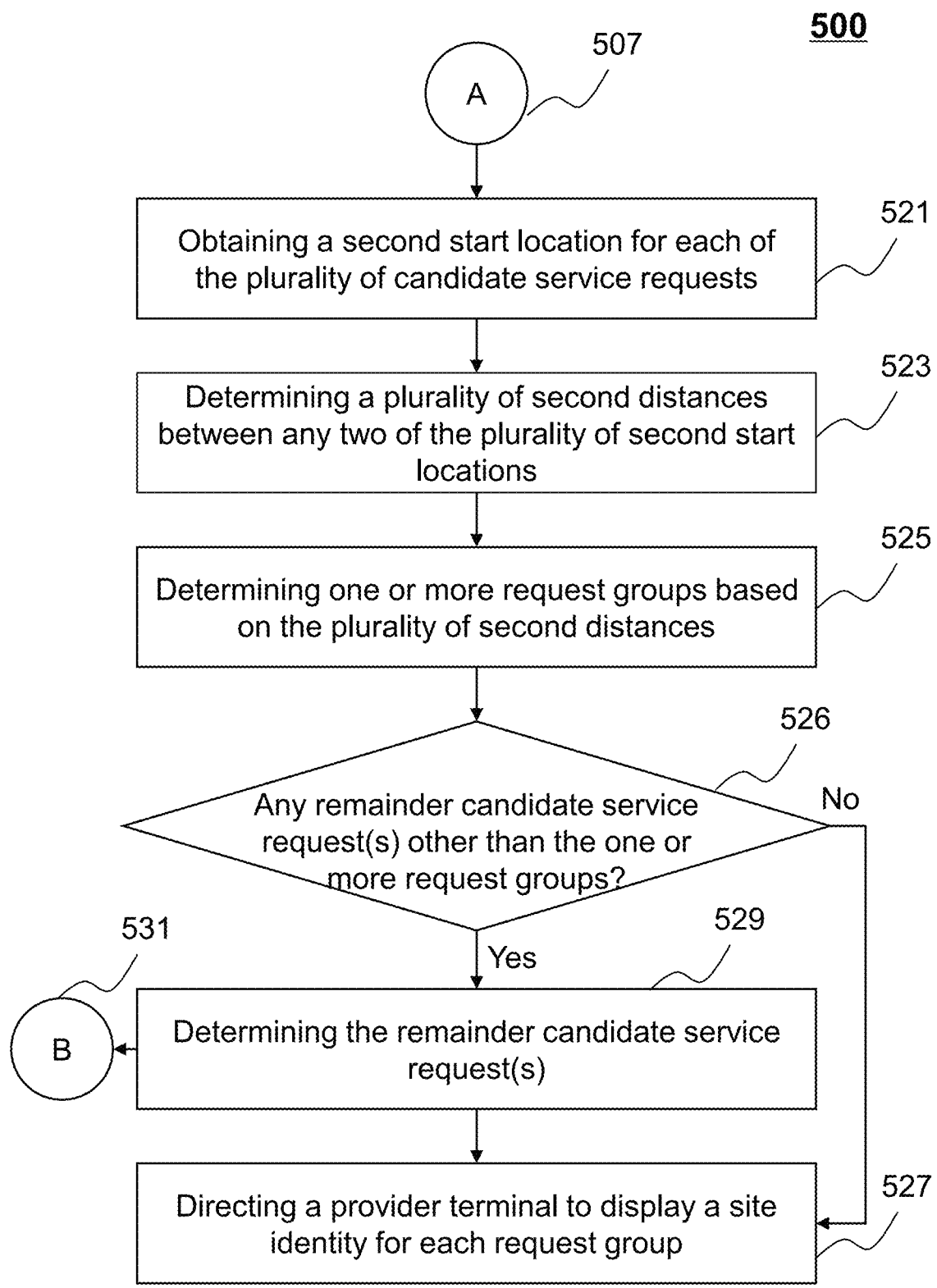
FIG. 5-B

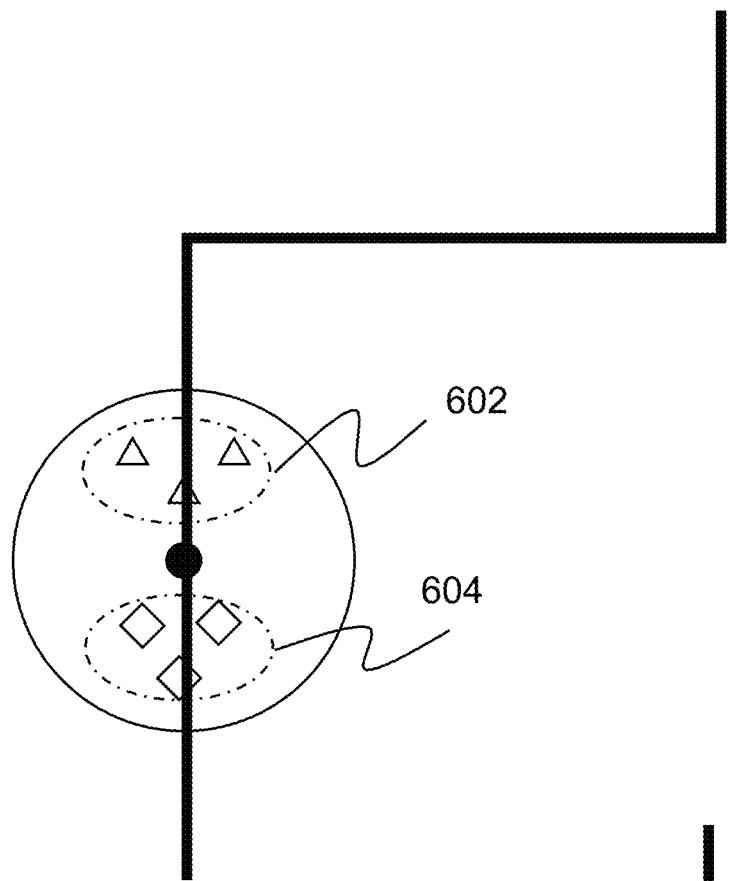
FIG. 6-A
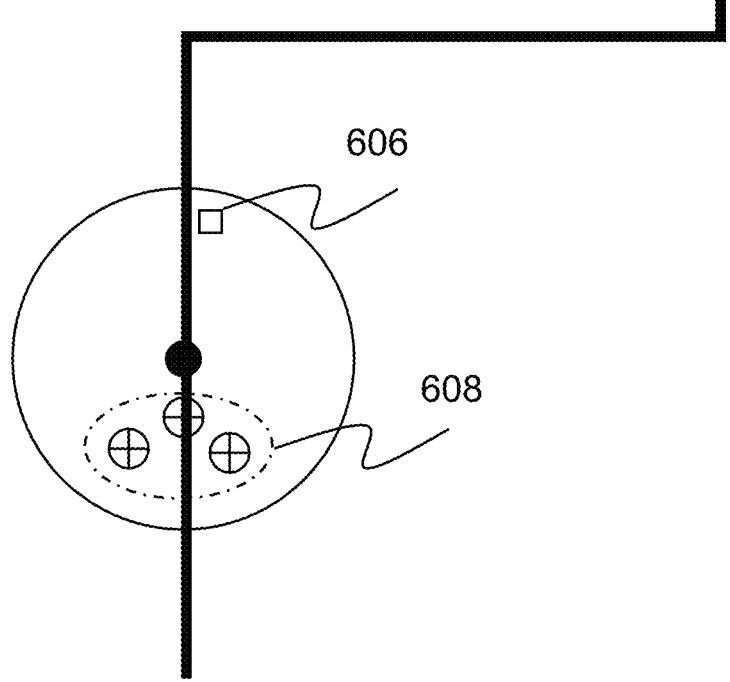
FIG. 6-B

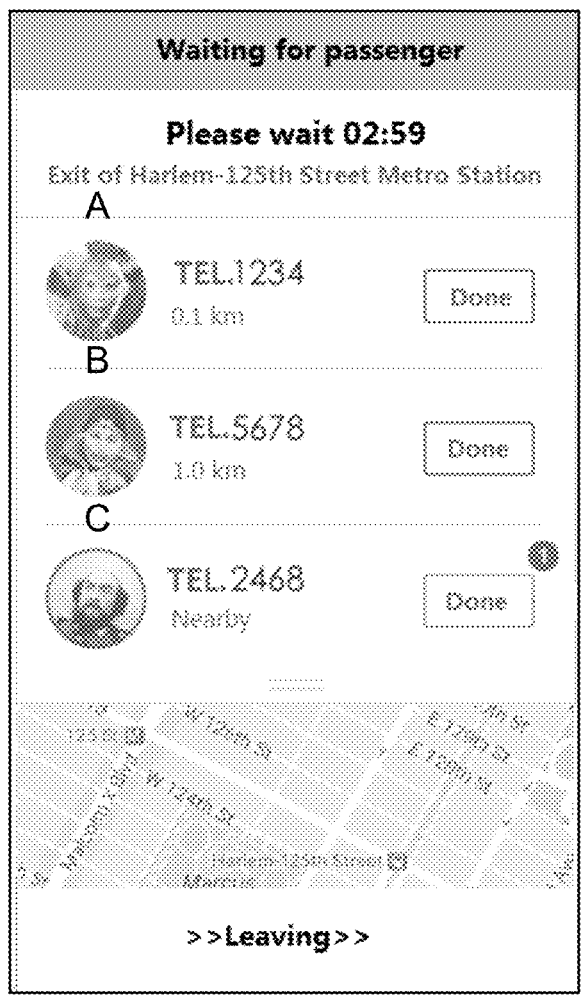
FIG. 7-A
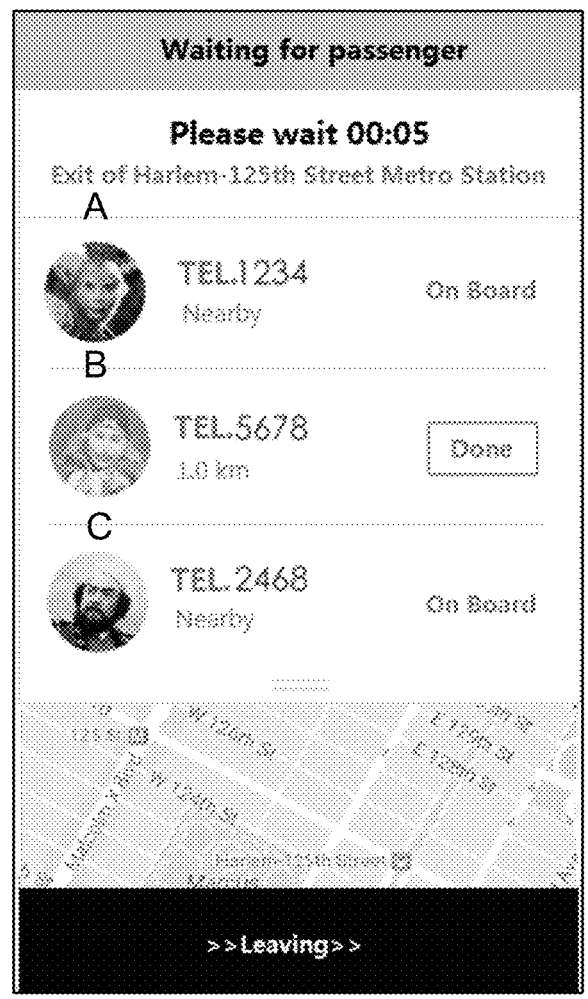
FIG. 7-B

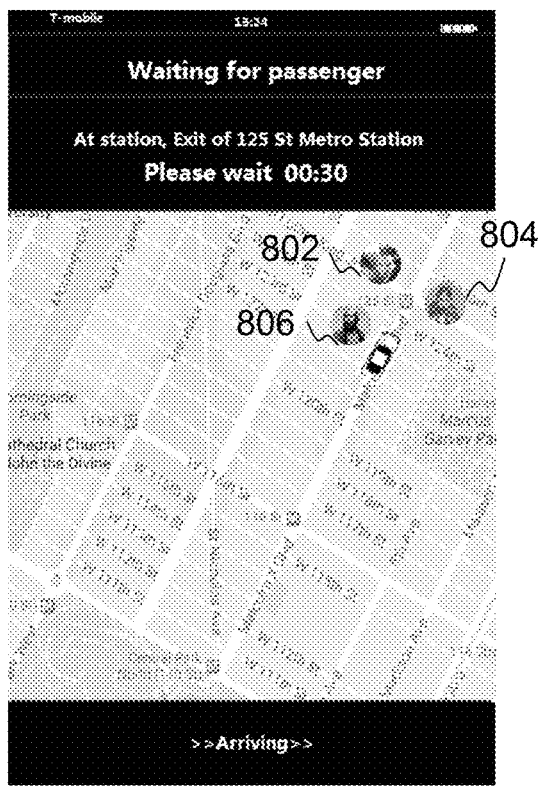
FIG. 8-A
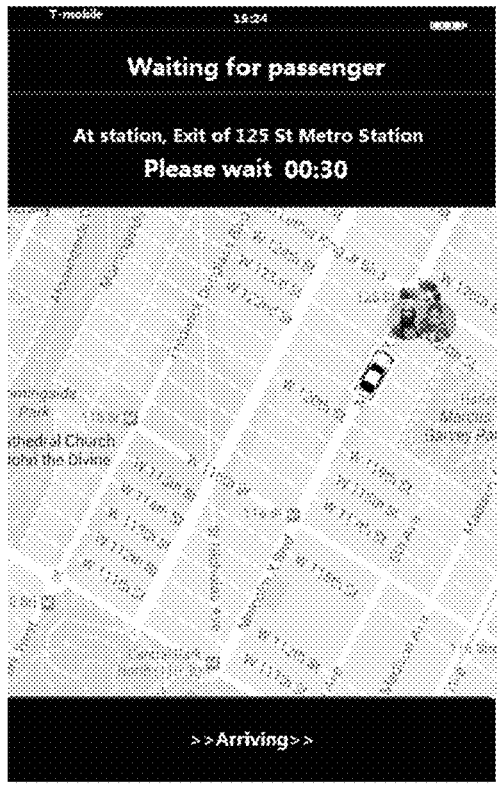
FIG. 8-B
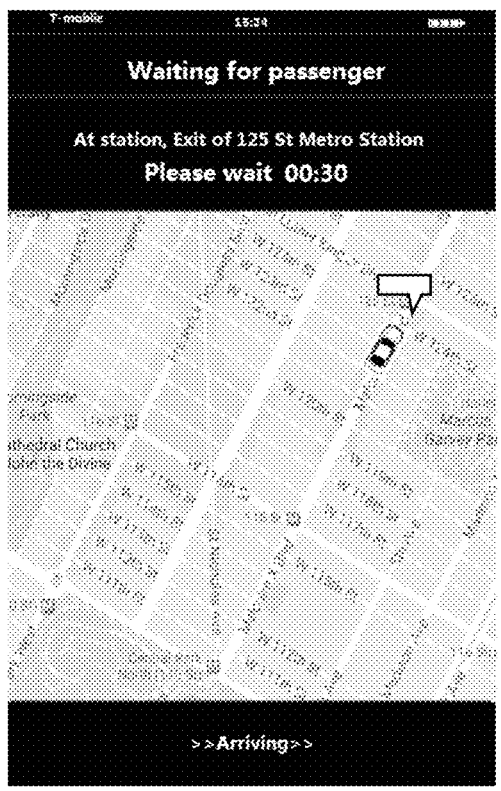
FIG. 8-C
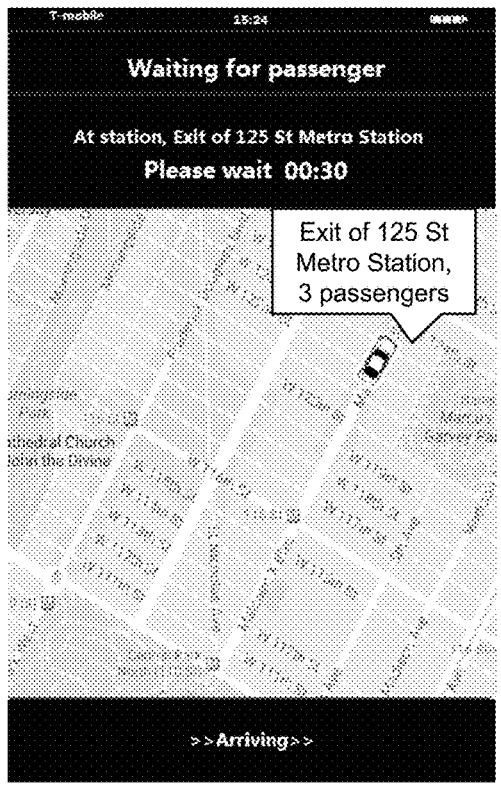
FIG. 8-D

900
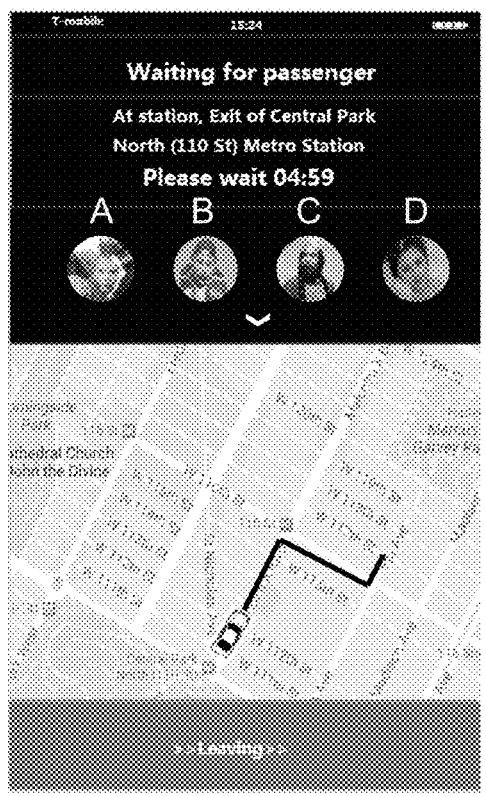
FIG. 9-A
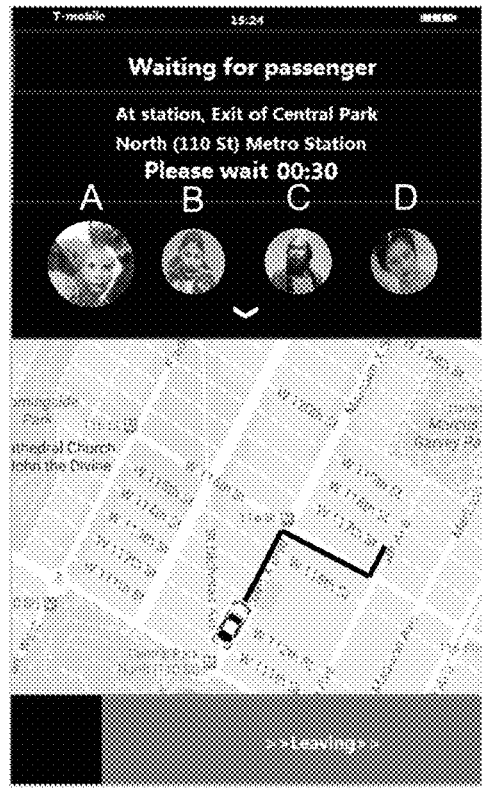
FIG. 9-B
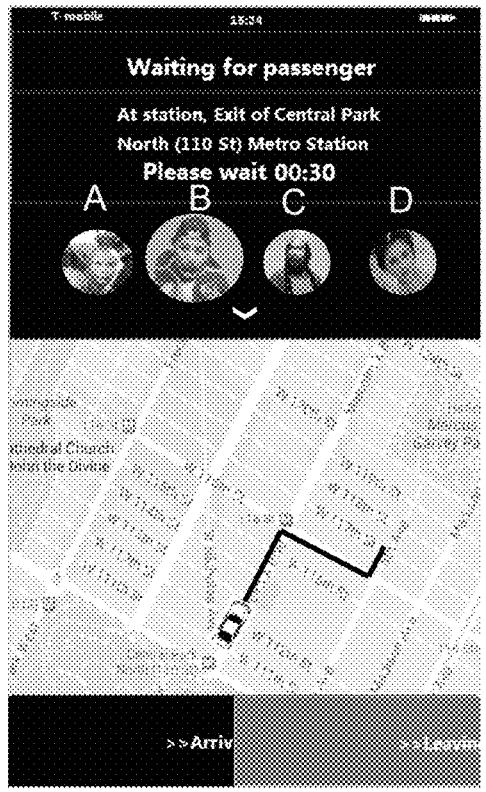
FIG. 9-C
FIG. 9-D

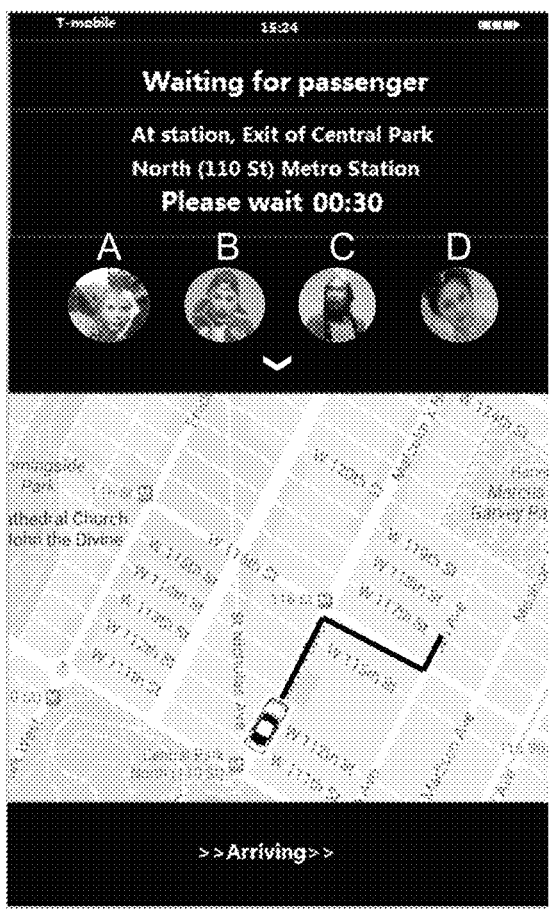 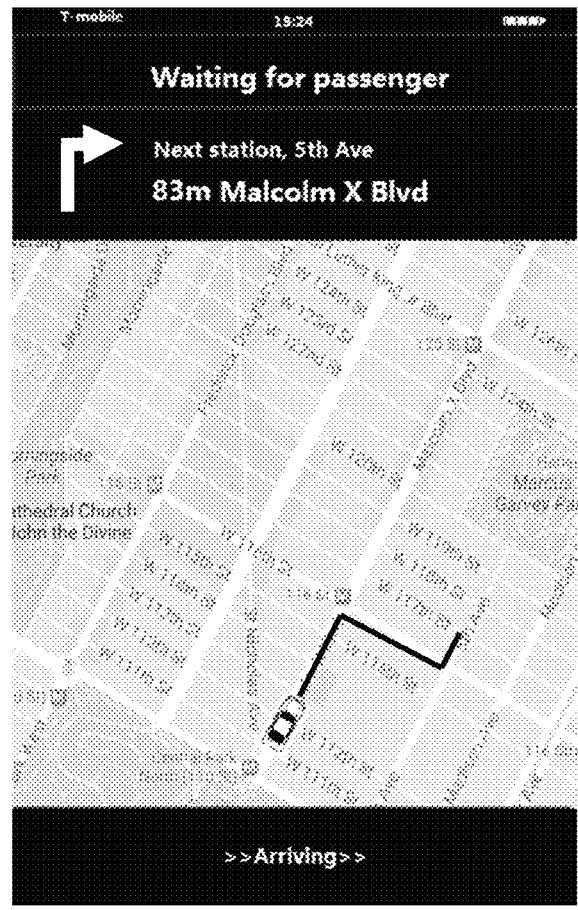
FIG. 9-E  FIG. 9-F

SYSTEMS AND METHODS FOR DISPLAYING AN IDENTITY RELATING TO A SERVICE REQUEST

CROSS-REFERENCE TO RELATED APPLICATIONS

This application is a continuation of International Application No. PCT/CN2016/112376, filed on Dec. 27, 2016, which claims priority to Chinese Application No. 201610356149.2 filed on May 25, 2016, the contents of which are incorporated herein by reference.

TECHNICAL FIELD

The present disclosure generally relates to systems and methods for on-demand service, and in particular, systems and methods for directing a display to display an identity relating to a service request.

BACKGROUND

With the development of Internet technology, on-demand transportation services, such as online taxi hailing services, have become more and more popular. Through an online transportation service platform, a requestor may request a transportation service through an application installed on user equipment, such as a smart phone terminal. Then a server of the platform may broadcast the request to service providers. A service provider may accept the request and pick up the requestor at a pick-up location. Under some situations, on the way to pick up the requestor, it may be difficult for the service provider to identity the requestor efficiently.

SUMMARY

According to an aspect of the present disclosure, a system may include one or more storage media and one or more processors configured to communicate with the one or more storage media. The one or more storage media may include a set of instructions for directing a display to display an identity relating to a service request. When the one or more processors executing the set of instructions, the one or more processors may be directed to perform one or more of the following operations. The one or more processors may obtain a target service request associated with a target transportation service from a target requestor. The one or more processors may then direct a provider terminal corresponding to a provider of the target transportation service to display an identity relating to the target service request to assist the provider to identify the target requestor.

In some embodiments, the identity relating to the target service request may include at least one of a requestor identity of the target requestor and/or a pick-up location identity.

In some embodiments, the one or more processors may determine a location of the provider. The one or more processors may determine a first start location of the target service request. The one or more processors may determine a first distance between the first start location and the location of the provider. The one or more processors may determine the first distance is less than a first threshold. The one or more processors may then direct the provider terminal to display the requestor identity.

In some embodiments, the requestor identity may include at least one of a name, an image, a telephone number, the first start location, and/or the first distance.

In some embodiments, the one or more processors may direct the provider terminal to display a pick-up icon relating to the requestor identity. The one or more processors may receive an instruction from the provider terminal when the pick-up icon is activated. The one or more processors may then determine the requestor is picked up based on the instruction.

In some embodiments, the one or more processors may direct the provider terminal to display an effect to the pick-up icon. The effect may include at least one of highlighting the pick-up icon, twinkling the pick-up icon, changing a size of the pick-up icon, blurring the pick-up icon, blurring a background of the pick-up icon, and/or fading the background of the pick-up icon.

In some embodiments, the one or more processors may obtain a plurality of candidate service requests, wherein a number of the plurality of candidate requests may be greater than a second threshold value, and each candidate service request may be associated with a candidate requestor from a plurality of candidate requestors. The one or more processors may obtain a second start location of the candidate service request for each candidate service request. The one or more processors may select a set of candidate service requests from the plurality of candidate service requests to combine into a request group, wherein a second distance between any two second start locations associated with the set of candidate service requests may be less than a third threshold value. The one or more processors may then direct the provider terminal to display a pick-up location identity relating to the request group.

In some embodiments, the pick-up location identity may include at least one of a pick-up location of the request group and/or the number of the set of candidate service requests in the request group.

In some embodiments, the pick-up location of the request group may be a central location among the second start locations associated with the set of candidate service requests.

In some embodiments, the one or more processors may direct the provider terminal to display a set of candidate requestor identities of the set of candidate service requests, wherein each candidate requestor identity may be associated with a candidate service request in the request group. The one or more processors may generate a requestor identity group by gathering the set of candidate requestor identities of the set of candidate service requests. The one or more processors may direct the provider terminal to display an icon of the requestor identity group. The one or more processors may shrink the icon of the requestor identity group. The one or more processors may hide the shrunk icon of the requestor identity group.

In some embodiments, the one or more processors may receive a first instruction relating to activating at least one of a set of candidate requestor identity icons corresponding to the set of candidate requestor identities from the provider terminal. The one or more processors may receive a second instruction relating to activating a predetermined control button from the provider terminal. The one or more processors may then determine a set of service statuses of the set of candidate service requests based on the first instruction and the second instruction.

In some embodiments, the set of service statuses may include a requestor status and/or a provider status, wherein the requestor status may include a picked-up status and/or a not-yet-picked-up status, and wherein the provider status may include an arrived status and/or a left status.

According to another aspect of the present disclosure, a method may include one or more of the following operations. A computer server may obtain a target service request associated with a target transportation service from a target requestor. The computer server may then direct a provider terminal corresponding to a provider of the target transportation service to display an identity relating to the target service request to assist the provider to identify the target requestor.

In some embodiments, the identity relating to the target service request may include at least one of a requestor identity of the target requestor and/or a pick-up location identity.

In some embodiments, the computer server may determine a location of the provider. The computer server may determine a first start location of the target service request. The computer server may determine a first distance between the first start location and the location of the provider. The computer server may determine the first distance is less than a first threshold. The computer server may then direct the provider terminal to display the requestor identity.

In some embodiments, the requestor identity may include at least one of a name, an image, a telephone number, the first start location, and/or the first distance.

In some embodiments, the computer server may direct the provider terminal to display a pick-up icon relating to the requestor identity. The computer server may receive an instruction from the provider terminal when the pick-up icon is activated. The computer server may then determine the requestor is picked up based on the instruction.

In some embodiments, the computer server may direct the provider terminal to display an effect to the pick-up icon. The effect may include at least one of highlighting the pick-up icon, twinkling the pick-up icon, changing a size of the pick-up icon, blurring the pick-up icon, blurring a background of the pick-up icon, and/or fading the background of the pick-up icon.

In some embodiments, the computer server may obtain a plurality of candidate service requests, wherein a number of the plurality of candidate requests may be greater than a second threshold value, and each candidate service request may be associated with a candidate requestor from a plurality of candidate requestors. The computer server may obtain a second start location of the candidate service request for each candidate service request. The computer server may select a set of candidate service requests from the plurality of candidate service requests to combine into a request group, wherein a second distance between any two second start locations associated with the set of candidate service requests may be less than a third threshold value. The computer server may then direct the provider terminal to display a pick-up location identity relating to the request group.

In some embodiments, the pick-up location identity may include at least one of a pick-up location of the request group and/or the number of the set of candidate service requests in the request group.

In some embodiments, the pick-up location of the request group may be a central location among the second start locations associated with the set of candidate service requests.

In some embodiments, the computer server may direct the provider terminal to display a set of candidate requestor identities of the set of candidate service requests, wherein each candidate requestor identity may be associated with a candidate service request in the request group. The computer server may generate a requestor identity group by gathering the set of candidate requestor identities of the set of candidate service requests. The computer server may direct the provider terminal to display an icon of the requestor identity group. The computer server may shrink the icon of the requestor identity group. The computer server may hide the shrunk icon of the requestor identity group.

In some embodiments, the computer server may receive a first instruction relating to activating at least one of a set of candidate requestor identity icons corresponding to the set of candidate requestor identities from the provider terminal. The computer server may receive a second instruction relating to activating a predetermined control button from the provider terminal. The computer server may then determine a set of service statuses of the set of candidate service requests based on the first instruction and the second instruction.

In some embodiments, the set of service statuses may include a requestor status and/or a provider status, wherein the requestor status may include a picked-up status and/or a not-yet-picked-up status, and wherein the provider status may include an arrived status and/or a left status.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 5-A and 5-B are flowcharts illustrating an exemplary process/method for directing a display to display a requestor identity or a pick-up location identity according to some embodiments of the present disclosure;

FIGS. 6-A and 6-B are schematic diagrams illustrating an exemplary process/method for determining a request group according to some embodiments of the present disclosure;

FIGS. 7-A and 7-B are schematic diagrams illustrating an exemplary user interface for displaying a requestor identity according to some embodiments of the present disclosure;

FIGS. 8-A through 8-D are schematic diagrams illustrating an exemplary user interface for displaying a pick-up location identity according to some embodiments of the present disclosure; and FIGS. 9-A through 9-F are schematic diagrams illustrating an exemplary user interface for modifying a service status according to some embodiments of the present disclosure.

DETAILED DESCRIPTION

Figure 1:
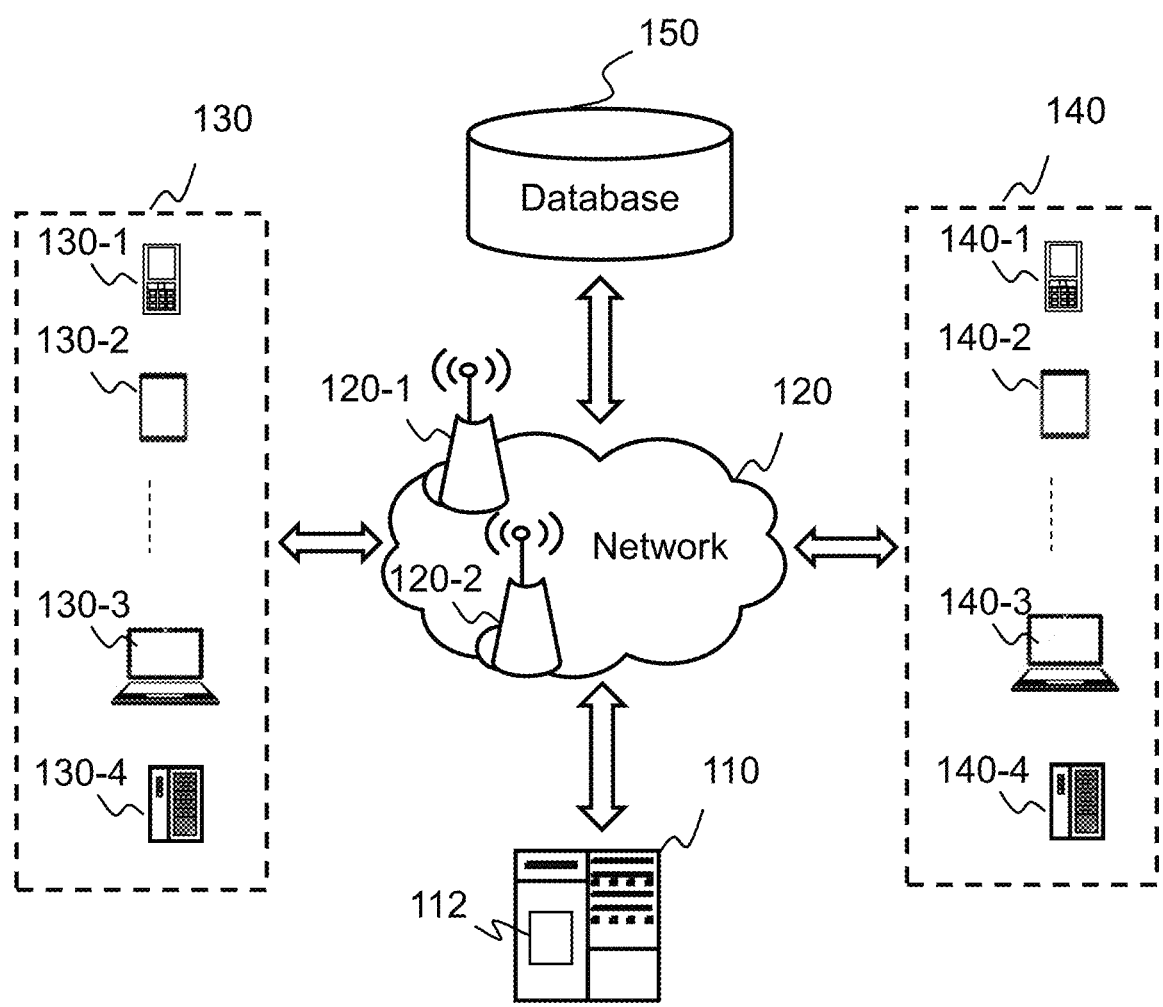
FIG. 1 is a schematic diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprises," "comprising," "includes," and/or "including" when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawing(s), all of which form a part of this specification. It is to be expressly understood, however, that the drawing(s) are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to directing a display to display an identity relating to a service request, it should also be understood that this is only one exemplary embodiment. The system or method of the present disclosure may be applied to any other kind of on-demand service. For example, the system or method of the present disclosure may be applied to different transportation systems including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system that applies management and/or distribution, for example, a system for sending and/or receiving an express. The application scenarios of the system or method of the present disclosure may include a webpage, a plug-in of a browser, a client terminal, a custom system, an internal analysis system, an artificial intelligence robot, or the like, or any combination thereof.

The term "passenger," "requester," "service requester," and "customer" in the present disclosure are used interchangeably to refer to an individual, an entity or a tool that may request or order a service. Also, the term "driver," "provider," "service provider," and "supplier" in the present disclosure are used interchangeably to refer to an individual, an entity or a tool that may provide a service or facilitate the providing of the service. The term "user" in the present disclosure may refer to an individual, an entity or a tool that may request a service, order a service, provide a service, or facilitate the providing of the service. For example, the user may be a passenger, a driver, an operator, or the like, or any combination thereof. In the present disclosure, "passenger" and "passenger terminal" may be used interchangeably, and "driver" and "driver terminal" may be used interchangeably.

The term "request", "service request" and "order" in the present disclosure are used interchangeably to refer to request that may be initiated by a passenger, a requester, a service requester, a customer, a driver, a provider, a service provider, a supplier, or the like, or any combination thereof. The service request may be accepted by any one of a passenger, a requester, a service requester, a customer, a driver, a provider, a service provider, or a supplier. The service request may be chargeable, or free.

The positioning technology used in the present disclosure may include a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning technologies may be used interchangeably in the present disclosure.

An aspect of the present disclosure provides online systems and methods for displaying a passenger's (i.e., a transportation service requestor) identity or a pick-up location identity on a driver's (e.g., a transportation service provider) user terminal to assist the driver to identify the passenger when the driver picks up the passenger.

It should be noted that online on-demand transportation service, such as online taxi hailing (or online public transportation service hailing), is a new form of service rooted only in post-Internet era. It provides technical solutions to users and service providers that could raise only in post-Internet era. In pre-Internet era, when a user hails a taxi on street, the taxi request and acceptance occur only between the passenger and one taxi driver that sees the passenger. If the passenger hails a taxi through telephone call, the service request and acceptance may occur only between the passenger and one service provider (e.g., one taxi company or agent). Online taxi, however, allows a user of the service to real-time and automatic distribute a service request to a vast number of individual service providers (e.g., taxi) distance away from the user. It also allows a plurality of service provides to respond to the service request simultaneously and in real-time. Therefore, through Internet, the online on-demand transportation systems may provide a much more efficient transaction platform for the users and the service providers that may never met in a traditional pre-Internet transportation service system.

FIG. 1 is a block diagram of an exemplary on-demand service system 100 according to some embodiments. The on-demand service system 100 may be an online transportation service platform including a server 110, a network 120, a requestor terminal 130, a provider terminal 140, and a database 150. The server 110 may include a processing engine 112.

In some embodiments, the server 110 may be a single server, or a server group. The server group may be centralized, or distributed (e.g., server 110 may be a distributed system). In some embodiments, the server 110 may be local or remote. For example, the server 110 may access information and/or data stored in the requestor terminal 130, the provider terminal 140, and/or the database 150 via the network 120. As another example, the server 110 may be directly connected to the requestor terminal 130, the provider terminal 140, and/or the database 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to the service request to perform one or more functions described in the present disclosure. For example, the processing engine 112 may direct a display to display an identity relating to a service request. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the requestor terminal 130, the provider terminal 140, and the database 150) may send information and/or data to other component(s) in the on-demand service system 100 via the network 120. For example, the server 110 may obtain/acquire service request from the requestor terminal 130 via the network 120. In some embodiments, the network 120 may be any type of wired or wireless network, or combination thereof. Merely by way of example, the network 130 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a requestor may be a user of the requestor terminal 130. In some embodiments, the user of the requestor terminal 130 may be someone other than the requestor. For example, a user A of the requestor terminal 130 may use the requestor terminal 130 to send a request for a user B, or receive service and/or information or instructions from the server 110. In some embodiments, a provider may be a user of the provider terminal 140. In some embodiments, the user of the provider terminal 140 may be someone other than the provider. For example, a user C of the provider terminal 140 may user the provider terminal 140 to receive a request for a user D, and/or information or instructions from the server 110. In some embodiments, "requestor" and "requestor terminal" may be used interchangeably, and "provider" and "provider terminal" may be used interchangeably.

In some embodiments, the requestor terminal 130 may include a mobile device 130-1, a tablet computer 130-2, a laptop computer 130-3, a built-in device in a motor vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, a smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google Glass, an Oculus Rift, a Hololens, a Gear VR, etc. In some embodiments, built-in device in the motor vehicle 130-4 may include an onboard computer, an onboard television, etc. In some embodiments, the requestor terminal 130 may be a device with positioning technology for locating the position of the requestor and/or the requestor terminal 130.

In some embodiments, the provider terminal 140 may be similar to, or the same device as the requestor terminal 130. In some embodiments, the provider terminal 140 may be a device with positioning technology for locating the position of the provider and/or the provider terminal 140. In some embodiments, the requestor terminal 130 and/or the provider terminal 140 may communicate with other positioning device to determine the position of the requestor, the requestor terminal 130, the provider, and/or the provider terminal 140. In some embodiments, the requestor terminal 130 and/or the provider terminal 140 may send positioning information to the server 110.

The database 150 may store data and/or instructions. In some embodiments, the database 150 may store data obtained from the requestor terminal 130 and/or the provider terminal 140. In some embodiments, the database 150 may store data and/or instructions that the server 110 may execute or use to perform exemplary methods described in the present disclosure. In some embodiments, database 150 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 150 may be connected to the network 120 to communicate with one or more components in the on-demand service system 100 (e.g., the server 110, the requestor terminal 130, the provider terminal 140, etc.). One or more components in the on-demand service system 100 may access the data or instructions stored in the database 150 via the network 120. In some embodiments, the database 150 may be directly connected to or communicate with one or more components in the on-demand service system 100 (e.g., the server 110, the requestor terminal 130, the provider terminal 140, etc.). In some embodiments, the database 150 may be part of the server 110.

In some embodiments, one or more components in the on-demand service system 100 (e.g., the server 110, the requestor terminal 130, the provider terminal 140, etc.) may have a permission to access the database 150. In some embodiments, one or more components in the on-demand service system 100 may read and/or modify information relating to the requestor, provider, and/or the public when one or more conditions are met. For example, the server 110 may read and/or modify one or more users' information after a service. As another example, the provider terminal 140 may access information relating to the requestor when receiving a request from the requestor terminal 130, but the provider terminal 140 may not modify the relevant information of the requestor.

In some embodiments, information exchanging of one or more components in the on-demand service system 100 may be achieved by way of requesting a service. The object of the service request may be any product. In some embodiments, the product may be a tangible product, or an immaterial product. The tangible product may include food, medicine, commodity, chemical product, electrical appliance, clothing, car, housing, luxury, or the like, or any combination thereof. The immaterial product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application relating to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

Figure 2:
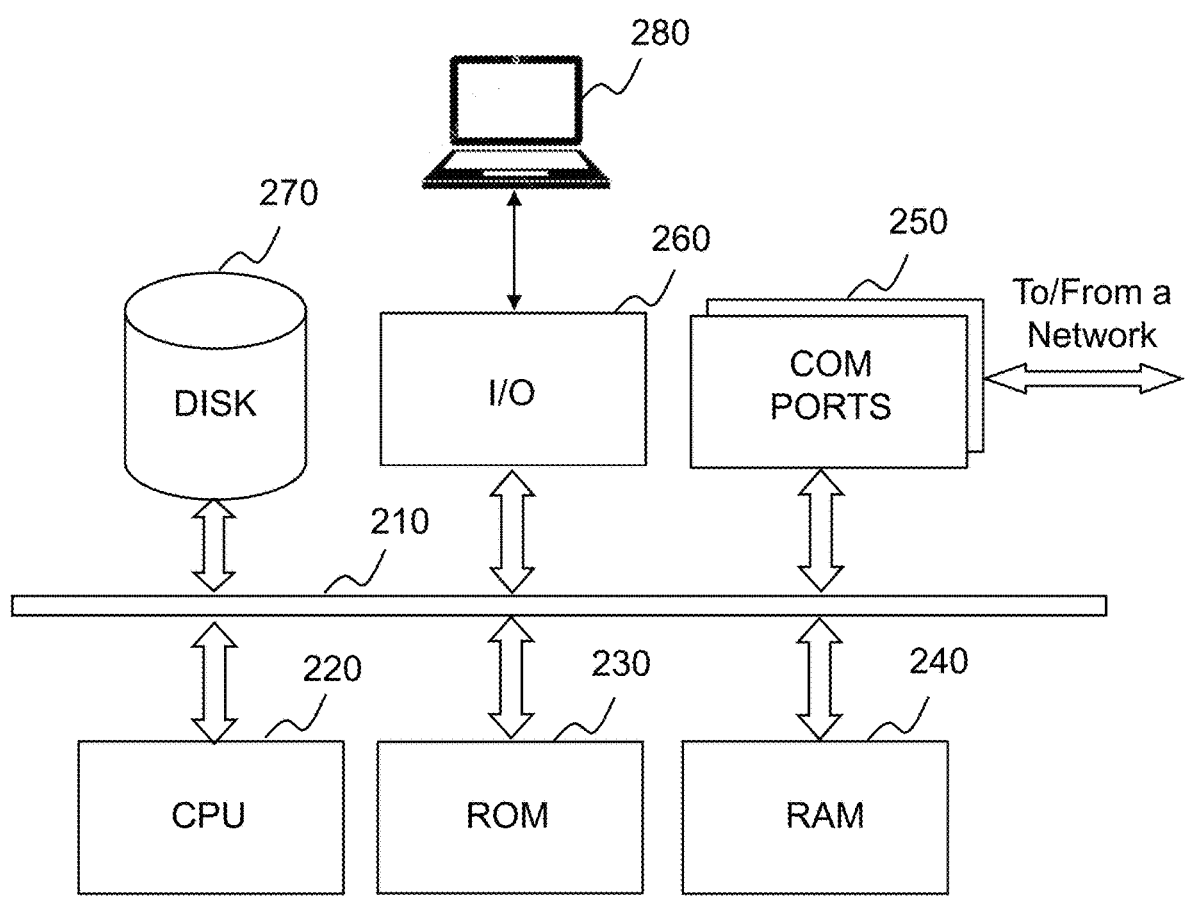
FIG. 2 is a block diagram illustrating an exemplary computing device in the on-demand service system according to some embodiments of the present disclosure.

FIG. 2 is a schematic diagram illustrating exemplary hardware and software components of a computing device 200 on which the server 110, the requestor terminal 130, and/or the provider terminal 140 may be implemented according to some embodiments of the present disclosure. For example, the processing engine 112 may be implemented on the computing device 200 and configured to perform functions of the processing engine 112 disclosed in this disclosure.

The computing device 200 may be a general purpose computer or a special purpose computer, both may be used to implement an on-demand system for the present disclosure. The computing device 200 may be used to implement any component of the on-demand service as described herein. For example, the processing engine 112 may be implemented on the computing device 200, via its hardware, software program, firmware, or a combination thereof. Although only one such computer is shown, for convenience, the computer functions relating to the on-demand service as described herein may be implemented in a distributed fashion on a number of similar platforms, to distribute the processing load.

The computing device 200, for example, may include COM ports 250 connected to and from a network connected thereto to facilitate data communications. The computing device 200 may also include a central processing unit (CPU) 220, in the form of one or more processors, for executing program instructions. The exemplary computer platform may include an internal communication bus 210, program storage and data storage of different forms, for example, a disk 270, and a read only memory (ROM) 230, or a random access memory (RAM) 240, for various data files to be processed and/or transmitted by the computer. The exemplary computer platform may also include program instructions stored in the ROM, RAM, and/or other type of non-transitory storage medium. The methods and/or processes of the present disclosure may be implemented as the program instructions. The computing device 200 also includes an I/O component 260, supporting input/output between the computer and other components therein such as user interface elements 280. The computing device 200 may also receive programming and data via network communications.

Merely for illustration, only one CPU and/or processor is described in the computing device 200. However, it should be note that the computing device 200 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
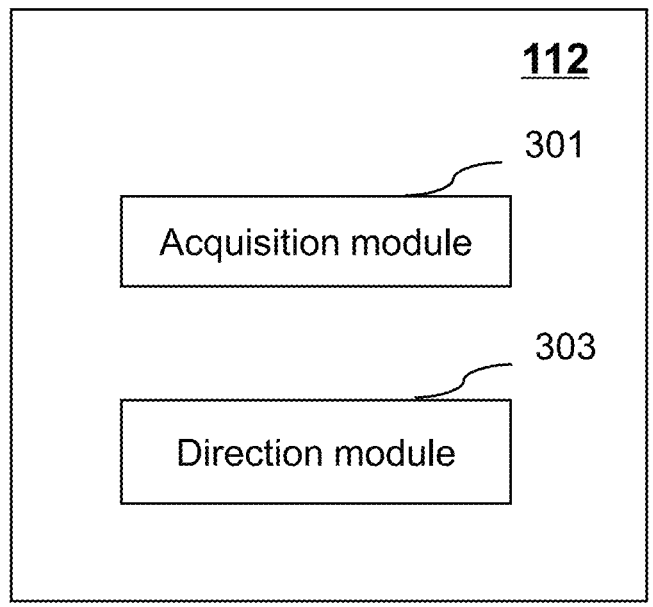
FIG. 3 is a block diagram illustrating an exemplary processing engine according to some embodiments of the present disclosure.

FIG. 3 is a block diagram illustrating an exemplary processing engine 112 according to some embodiments of the present disclosure. The processing engine 112 may include an acquisition module 301 and a direction module 303.

The acquisition module 301 may be configured to obtain a service request from a requestor. In this disclosure, the service request may refer to a request for a transportation service which has been accepted by a service provider. As used herein, "accept" may refer to that the service provider agrees to provide the transportation service for the requestor. After the service provider accepts the service request, the requestor may wait for the service provider at a specific location. The transportation service may be a service for a taxi, a private vehicle, a bus, a truck, a bicycle, a ship, an aircraft, a test drive, a designated driving, or the like, or a combination thereof. The acquisition module 301 may obtain the service request from the requestor terminal 130 via the network 120. The service request may be transmitted to the direction module 303 to be further processed. In some embodiments, the acquisition module 301 may obtain a plurality of service requests from a plurality of requestors.

The direction module 303 may be configured to direct a display (e.g., a screen) to display an identity relating to the service request. The identity relating to the service request may include a requestor identity (e.g., a name of the requestor) and/or a pick-up location identity (e.g., a pick-up location of the service request). The direction module 303 may direct a display on the provider terminal 140 or a display associated with the provider terminal 140 (e.g., a screen in a vehicle) to display the identity relating to the service request.

In some embodiments, the processing engine 112 may further include a modification module (not shown in FIG. 3). The modification module may be configured to modify a service status (e.g., a picked-up status of the requestor, an arrived status of the service provider). The modification module may modify the service status based on one or more instructions (e.g., pressing a predetermined control button) from the service provider.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Any two of the modules may be combined as a single module, any one of the modules may be divided into two or more units.

Figure 4:
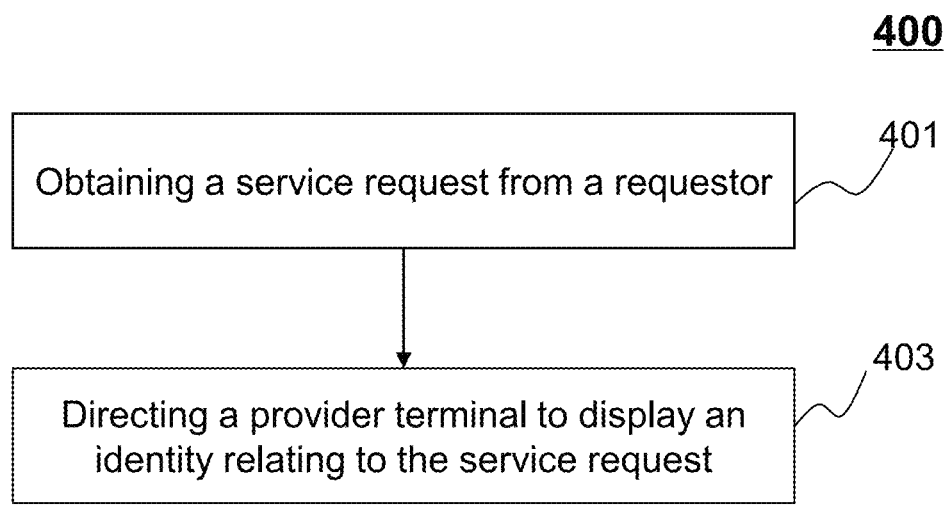
FIG. 4 is a flowchart illustrating an exemplary process/method for directing a display to display an identity relating to a service request according to some embodiments of the present disclosure.

FIG. 4 is a flowchart illustrating an exemplary process/method 400 for directing a display to display an identity relating to a service request according to some embodiments of the present disclosure. The process/method 400 may be performed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 400.

In step 401, the processing engine 112 may obtain a service request from a requestor.

The service request may be a request for a transportation service (e.g., a taxi service, a bus service) corresponding to a service provider. The service request may include a start location, a destination, a start time, or the like, or a combination thereof. The start location may be a current location of the requestor or a location defined by the requestor or the on-demand service system 100.

In some embodiments, the transportation service may include a plurality of pick-up locations. As used herein, the pick-up location may refer to a location where the service provider may pick up the requestor. For example, the bus service may include a plurality of pick-up locations (i.e., bus stations) along a specific route and a schedule illustrated in Table 1 below. Under this situation, the requestor may determine the start location and/or the start time of the service request according to the route and the schedule.

Table 1 a table illustrating an exemplary route and schedule of a bus service

| Pick-up Location | Pick-up Time |
|---|---|
| 110 St | 18:05 |
| 145 St | 18:20 |
| Jackson Ave | 18:45 |
| Freeman St | 19:05 |
| . . . | . . . |

In some embodiments, for the bus service, the route and/or the schedule may be adjustable. For example, the route may be fixed but the pick-up locations may be adjustable. As another example, the pick-up locations may be fixed but the route may be adjustable. As a further example, both the route and the pick-up locations may be adjustable.

In some embodiments, the transportation service may include one or more pick-up locations that are not predetermined. For example, for a taxi service, the pick-up location may be the current location of the requestor and/or the current location of the requestor terminal 130 (e.g., by a Global Position System (GPS) in the requestor terminal 130), or a defined location as the start location, and the service provider may pick up the requestor at the start location.

In some embodiments, for a specific transportation service, there may be a plurality of service requests corresponding to a plurality of requestors. Take the bus service as an example, a plurality of requestors may send a plurality of service requests for the bus service. Each of the plurality of service requests may include a specific start location. Under this situation, the processing engine 112 may analyze a plurality of start locations and determine one or more pick-up locations for the plurality of requestors. For example, a first service request includes a first start location, a second service request includes a second start location, the processing engine 112 may determine a center location of the first start location and the second start location as a pick-up location for the first service request and the second service request.

In step 403, the processing engine 112 may direct a display on or associated with the provider terminal 140 to display an identity relating to the service request.

The identity relating to the service request may include a requestor identity and/or a pick-up location identity. As used herein, a requestor identity may refer to an identity that may assist a service provider to identify the requestor. The pick-up location identity may refer to an identity that may assist the service provider to identify a pick-up location of a request group and/or the number of requestors corresponding to the request group. As used herein, the request group may refer to a group including a set of service requests. The set of service requests may correspond to a set of requestors.

The requestor identity may include a name, an image, a telephone number, a start location (or a pick-up location) of the service request, a distance between the start location and a location of the service provider, or the like, or a combination thereof. The pick-up location identity may include a pick-up location of a requestor, a request group or the number of the requestors corresponding to the request group. The display may display the requestor identity and/or the pick-up location identity in various forms, for example, text, picture, audio, video, or the like, or a combination thereof. For example, the processing engine 112 may display the requestor identity as a requestor identity icon, and display the pick-up location identity as a pick-up location identity icon.

In some embodiments, the processing engine 112 may further provide a navigation service for the service provider on the provider terminal 140. For example, the processing engine 112 may display information associated with the service request on a map (e.g., a Tencent map, a Google Map, or a Baidu map etc.) on the provider terminal 140, for example, the location of the service provider, the start location of the service request, a pick-up location of a request group, a route from the location of the service provider to the start location or the pick-up location, a needed time from the location of the service provider to the start location or the pick-up location, a distance of the route, or the like, or a combination thereof. While on the way to pick up the requestor, the processing engine 112 may provide one or more notifications for the service provider. The notification may be associated with a speed limit, a traffic light, a road condition, or the like, or a combination thereof. In some embodiments, the service provider may set a navigation preference via the provider terminal 140. The navigation preference may include a volume of a navigation voice, a display effect associated with the road condition (e.g., read for traffic congestion, green for smooth), nearby entertainment, or the like, or a combination thereof.

In some embodiments, after the service provider picks up the requestor, the service provider may perform a plurality of operations to modify a service status of the service request via the provider terminal 140 (e.g., an user interface illustrated in FIGS. 7-A and 7-B and/or FIGS. 9-A through 9-F). The service status may include a requestor status and a provider status. The requestor status may include a picked-up status and a not-yet-picked-up status. The provider status may include an arrived status and a left status.

FIGS. 5-A and 5-B are flowcharts illustrating an exemplary process/method 500 for directing a display to display a requestor identity and/or a pick-up location identity according to some embodiments of the present disclosure. The process and/or method 500 may be executed by the on-demand service system 100. For example, the process and/or method may be implemented as a set of instructions (e.g., an application) stored in the storage ROM 230 or RAM 240. The CPU 210 may execute the set of instructions and may accordingly be directed to perform the process and/or method 500.

In step 501, the processing engine 112 may obtain a plurality of candidate service requests from a plurality of candidate requestors within a predetermined region.

The plurality of candidate service requests may be requests for a transportation service (e.g., a bus service). The predetermined region may include an administrative area (e.g., a district in a city), or a geographical region (e.g., within a certain radius from a defined center location). For example, the processing engine 112 may define a location on or near the route of the bus service and obtain the plurality of candidate service requests of which start locations are within a certain radius (e.g., 1 km) from the defined location. In some embodiments, the processing engine 112 may obtain the plurality of candidate service requests within a predetermined time period. As used herein, the predetermined time period may refer to a time period from a current time point to a defined time point. For example, the processing engine 112 may obtain the plurality of candidate service requests of which start times are within 10 minutes from the current time point.

In step 503, the processing engine 112 may determine the number of the plurality of candidate service requests. In step 505, the processing engine 112 may determine whether the number of the plurality of candidate service requests is larger than a first threshold (e.g., 2). If not, the processing engine 112 may execute the process and/or method to step 509 to determine a target service request corresponding to a target requestor. The processing engine 112 may determine the target service request from the plurality of candidate service requests. For example, if there are two candidate service requests, the processing engine 112 may select one of the two candidate service requests as the target service request. As another example, the processing engine 112 may determine both the two candidate service requests as the target service requests.

In step 511, the processing engine 112 may determine a first start location of the target service request. The first start location may be a specific pick-up location (e.g., a bus station of a bus service) of the transportation service, a current location of the requestor (e.g., taxi pick-up location) which may be obtained via a GPS in the requestor terminal 130, or a location defined by the requestor.

In step 513, the processing engine 112 may determine a location of a service provider.

The service provider may be a provider who has accepted the plurality of candidate service requests. The processing engine 112 may obtain the location of the service provider via a GPS in the provider terminal 140 or a driving recorder in a corresponding vehicle (i.e., the vehicle of the service provider).

In step 515, the processing engine 112 may determine a first distance between the first start location and the location of the provider. It should be noted that "distance" used in this disclosure may refer to a spatial distance or a travel distance. As used herein, a spatial distance may refer to a driving distance or walking distance. For example, the spatial distance may be the length of a path along which a service provider can drive a vehicle, such as a portion of road or a street.

In step 517, the processing engine 112 may determine whether the first distance is less than a second threshold (e.g., 50 meters, 100 meters). If the answer is no, the processing engine 112 may execute the process and/or method 500 back to step 513, that is, to update the location of the service provider after a time period (e.g., 1 minute, 5 minutes). If the answer is yes, the processing engine 112 may execute the process and/or method 500 to step 519 to direct a display (e.g., a user interface 700 on the provider terminal 140 illustrated in FIG. 7-A or FIG. 7-B) to display (e.g., highlight) a requestor identity relating to the target service request. The requestor identity may include a name, an image (e.g., a head image), a telephone number, the first start location, the first distance, or the like, or a combination thereof. The name may be a real name of the target requestor or a nickname. The telephone number may be a complete telephone number, or a section of the telephone number (e.g., last four numbers). The requestor identity may further include time information associated with the service request, for example, a needed time from the location of the service provider to the first start location. The display may display the requestor identity in a form of picture, text, audio, video, or the like, or a combination thereof. The display may display the requestor identity in various display effects, for example, highlighting, twinkling, colored, or enlarged.

After the service provider picks up the target requestor, the service provider may modify the requestor status from a not-yet-picked-up status to a picked-up status, and then modify the provider status from an arrived status to a left status. For example, the service provider may activate (e.g., press) a predetermined control button (e.g., a button "Done" illustrated in FIG. 7-A or FIG. 7-B, also referred to as a pick-up icon) to determine that the target requestor has been picked up. If the requestor is not picked up in a predetermined time period (e.g., 5 minutes), the service provider may only modify the provider status from the arrived status to the left status. As used herein, the predetermined time period may refer to a time period within which the service provider may wait for the requestor to be picked up. The predetermined time period may include a start time point, and the start time point may be the time point when the service provider arrives at a pick-up location. The predetermined time period may be default settings of the on-demand service system 100, or may be adjustable depending on different situations. For example, if the pick-up location is in an area with heavy traffic, the predetermined time period may be reasonably shorter (e.g., 5 minutes) for ordinary person in the art, whereas if the pick-up location is in an area with light traffic, the predetermined time period may be reasonably longer (e.g., 15 minutes) for ordinary person in the art. As another example, in a traffic peak period, the predetermined time period may be relatively small (e.g., 5 minutes), whereas in idle period (e.g., 10:00-12:00 am), the predetermined time period may be relatively large (e.g., 15 minutes).

If the number of the plurality of candidate service requests is larger than the first threshold, the processing engine 112 may execute the process and/or method 500 to node A 507 and perform at least some of steps starting from node A 507 illustrated in FIG. 5-B.

In step 521, the processing engine 112 may determine a second start location for each of the plurality of candidate service requests. In step 523, the processing engine 112 may determine a plurality of second distances between any two of the plurality of second start locations. For example, for a service request O, a service request P, and a service request Q, the processing engine 112 may obtain a second start location $O_0$, a second start location $P_0$, and a second start location $Q_0$, and determine a second distance $O_0P_0$, a second distance $P_0Q_0$, and a second distance $O_0Q_0$.

In step 525, the processing engine 112 may determine one or more request groups based on the plurality of second distances. For example, for the service request O, the service request P, and the service request Q, if all the second distances including $O_0P_0$, $P_0Q_0$, and $O_0Q_0$ are less than a third threshold (e.g., 1 kilometer), the processing engine 112 may combine the service request O, the service request P, and the service request Q as a request group. Each request group may include a set of candidate service requests, and each of the candidate service requests may be referred to as a request member of the request group. The set of candidate service requests may correspond to a set of candidate requestors.

In step 527, the processing engine 112 may determine whether there are remainder candidate service request other than the one or more request groups. If so, the processing engine 112 may execute the process and/or method 500 to step 529 to determine the remainder candidate service request(s). Further, the processing engine 112 may execute the process and/or method 500 to node B 531 and perform at least some of steps from node B 531, that is, the processing engine 112 may determine a target service request from the remainder candidate service request(s) and perform the following operations from step 511. If not, the processing engine 112 execute the process and/or method to step 527 to direct a display (e.g., a user interface on the provider terminal 140 illustrated in FIG. 8-D) to display a pick-up location identity for each request group. In some embodiments, after the processing engine 112 determines the remainder candidate service requests in step 529, the processing engine 112 may execute the process and/or method 500 to step 527 to display a pick-up location identity for each request group.

The pick-up location identity may include a pick-up location of the request group or the number of the requestors corresponding to the request group. In some embodiments, the pick-up location of the request group may be a center location of the second start locations of the request members in the request group. For example, for the request group including the service request O, the service request P, and the service request Q, the pick-up location of the request group may be a center location of the second start location $O_0$, the second start location $P_0$, and the second start location $Q_0$. In some embodiments, the pick-up location of the request group may be a location (e.g., a bus station) in vicinity of the second start locations of the request members in the request group where the service provider can stop to pick up the requestors. As used herein, "in vicinity" may refer to that a distance between the pick-up location and each of the second start locations is less than a fourth threshold (e.g., 500 meters).

In some embodiments, the processing engine 112 may display the pick-up location identity dynamically. For example, the processing engine 112 may direct provider terminal 140 to display a set of candidate requestor identities of the set of candidate service requests, as used herein, each candidate requestor identity may be associated with a candidate service request in the request group. The processing engine 112 may generate a requestor identity group by gathering the set of candidate requestor identities of the set of candidate service requests. The processing engine 112 may direct the provider terminal 140 to display an icon of the requestor identity group (e.g., a gathered image associated with the set of candidate requestor identities). The processing engine 112 may further shrink the icon of the requestor identity group. The processing engine 112 may still further hide the shrunk icon of the requestor identity group (e.g., see FIGS. 8-A through 8-D and the description thereof). Further, the processing engine 112 may direct the provider terminal 140 to display the pick-up location. It should be noted that the example above is provided only for illustration purposes, and not intended to limit the scope of the present disclosure.

In some embodiments, the processing engine 112 may further send the pick-up location of the request group to each of the requestor terminals 130 corresponding to the requestors of the request group so that the requestors can move to the pick-up location to wait for the service provider.

When the service provider arrives at the pick-up location, the processing engine 112 may direct a display (e.g., a user interface 900 illustrated in FIGS. 9-A through 9-F on the provider terminal 140) to display a set of candidate requestor identities of the set of candidate requestors (e.g., a set of candidate requestor identity icons (e.g., head images)) corresponding to the request group. After the service provider picks up all or a part of the set of candidate requestors corresponding to the request group, the service provider may modify the requestor statuses of the set of candidate requestors and the provider status simultaneously or successively. For example, the service provider may activate a candidate requestor identity icon (e.g., click a head image of a first candidate requestor (here referred to as a "first instruction")) to determine that the first candidate requestor has not been picked up, and activate a predetermined control slider (e.g., a slider "Leaving" illustrated in FIGS. 9-A through 9-F) (here referred to as a "second instruction") to determine that the service provider is leaving the pick-up location or will leave the pick-up location soon (e.g., after 1 minutes). After receiving the first instruction and the second instruction, the processing engine 112 may modify the provider status from an arrived status to a left status and modify requestor statuses of the remainder candidate requestors other than the first candidate requestor from not-yet-picked-up statuses to picked-up statuses.

It should be noted that the above description is merely provided for the purposes of illustration, and not intended to limit the scope of the present disclosure. For persons having ordinary skills in the art, multiple variations and modifications may be made under the teachings of the present disclosure. However, those variations and modifications do not depart from the scope of the present disclosure. For example, step 513 may be performed before step 511; step 511 and step 513 may be performed simultaneously.

FIGS. 6-A and 6-B are schematic diagrams illustrating an exemplary process/method for determining a request group according to some embodiments of the present disclosure. The solid straight line refers to a default route of a bus service. As used herein, the default route may refer to a route predetermined by a service provider or the on-demand service system 100. In actual operation, the default route may be adjustable, for example, left shift, right shift.

As illustrated in FIGS. 6-A and 6-B, the processing engine 112 may define a location (the solid black point) on the default route and determine a circle from the location with a certain radius (e.g., 1 km). Within the circle, the processing engine 112 may determine a plurality of candidate service requests. The processing engine 112 may determine a plurality of distances between any two of the plurality of candidate service requests. Further, as illustrated in FIG. 6-A, the processing engine 112 may select a first set of candidate service requests from the plurality of candidate service requests to combine into a first request group 602. For the request group 602, a distance between any two of the first set of candidate service requests may be less than a threshold (e.g., 500 meters). Similarly the processing engine 112 may select a second set of candidate service requests from the plurality of candidate service requests to combine into a second request group 604. As illustrated in FIG. 6-B, the processing engine 112 may select a third set of candidate service requests from the plurality of candidate service requests to combine into a third request group 608. Other than the third request group, the processing engine 112 may find that there is a remainder service request 606. After the processing engine 112 determines the request group(s) and the remainder service request(s), the processing engine 112 may direct a display to display a requestor identity and/or a pick-up location identity relating to the request group(s) and the remainder service request(s).

FIGS. 7-A and 7-B are schematic diagrams illustrating an exemplary user interface 700 for displaying a requestor identity according to some embodiments of the present disclosure. The user interface 700 may be on the provider terminal 140 or a display (e.g., a screen in a vehicle corresponding to the service provider) associated with the service provider. As illustrated in FIG. 7-A, the provider status is "waiting for passenger" (also referred to as an "arrived status"), that is, the service provider has arrived at a pick-up location "Exit of Harlem-125th Street Metro Station". "Please wait 02:59" refers to that the service provider may wait for the passenger(s) within the time period. When the service provider is on the way to pick up the requestors, the processing engine 112 may dynamically compare a distance between a location of the service provider and a start location of a service request, and when the distance is less than a threshold (150 meters), the processing engine 112 may highlight the requestor identity on the user interface 700. It may be seen that the user interface 700 includes a map on which the location of the provider and/or the start location(s) of the service request(s) may be displayed.

As illustrated in FIG. 7-A, it may be seen that there are three service requests including a service request A corresponding to a requestor A, a service request B corresponding to a requestor B, and a service request C corresponding to a requestor C. For service request A, the processing engine 112 may display a requestor identity A on the user interface 700. The requestor identity A may include a head image A of the requestor A, a telephone number section "TEL.1234", and a distance A (e.g., 0.1 km) between a start location A and the location of the service provider. For service request B, the processing engine 112 may display a requestor identity B on the user interface 700. The requestor identity B may include a head image B of the requestor B, a telephone number section "TEL.5678", and a distance B (e.g., 1.0 km) between a start location B and the location of the service provider. For service request C, the processing engine 112 may display a requestor identity C on the user interface 700. The requestor identity C may include a head image C of the requestor C, a telephone number section "TEL.2468", and a distance C (e.g., nearby) between a start location C and the location of the service provider. As used herein, "nearby" refers to that the distance C may be less than a threshold (e.g., 50 meters), and at the moment the processing engine 112 may highlight the head image C which may assist the service provider to identify the requestor C. For example, the processing engine 112 may provide an icon "①" besides the head image C. Similarly, the processing engine 112 may highlight the head image A to assist the service provider to identify the requestor A.

As illustrated in FIG. 7-B, after the requestor A and/or the requestor C has got on the vehicle, the processing engine 112 may the provider terminal 140 to display a corresponding requestor status button (e.g., "Done", also referred to as a pick-up icon) and the service provider may activate (e.g., press) the button which indicates that the requestor A and/or the requestor C has been picked up. In some embodiments, the processing engine 112 may direct the provider terminal 140 to display an effect to the requestor status button. The effect may include highlighting the pick-up icon, twinkling the pick-up icon, changing a size of the pick-up icon, blurring the pick-up icon, blurring a background of the pick-up icon, fading the background of the pick-up icon, or the like, or a combination thereof. After receiving an instruction relating to pressing the button, the processing engine 112 may modify the requestor status of the requestor A and/or the requestor status of the requestor C from a not-yet-picked-up status to a picked-up status (e.g., "On board"). And then the processing engine 112 may change the color of the head image A and/or the color of the head image C from grey to black-and-white (or from hazy to clear). After the service provider picks up the requestor A and the requestor C at the pick-up location "Exit of Harlem-125th Street Metro Station", the service provider may slide a slider "Leaving" from left to right which indicates that the service provider is leaving the pick-up location "Exit of Harlem-125th Street Metro Station". After receiving an instruction relating to sliding the slider, the processing engine 112 may modify the provider status of the service provider from an arrived status to a left status.

FIGS. 8-A through 8-D are schematic diagrams illustrating an exemplary user interface 800 for displaying a pick-up location identity according to some embodiments of the present disclosure.

As illustrated in FIG. 8-A, on the map, 802 refers to the start location A of service request A, 804 refers to the start location B of service request B, and 806 refers to the start locations C of service request C. The processing engine 112 may determine that distances AC, AB, and BC are all less than a threshold (e.g., 500 meters). Under this situation, the processing engine 112 may combine service request A, service request B, and service request C as a request group and display a pick-up location identity of the request group. As illustrated in FIG. 8-B, the processing engine 112 may gather the head image A, the head image B, and the head image C together as an image group. Further, as illustrated in FIG. 8-C, the processing engine 112 may shrink the gathered head images (or the image group) gradually and then hide it, and provide a textbox on the user interface 800. As illustrated in FIG. 8-D, the processing engine 112 may display the pick-up location identity as an address of the pick-up location of the request group (e.g., "Exit of 125 St Metro Station") and the number of the requestors corresponding to the request group (e.g., "3 passengers") in the textbox. Further, the processing engine 112 may enlarge the textbox dynamically to notify the service provider the pick-up location and the number of requestors.

FIGS. 9-A through 9-F are schematic diagrams illustrating an exemplary user interface 900 for modifying a service status of a request group according to some embodiments of the present disclosure. As illustrated in FIG. 9-A, the service provider has accepted a request group including a service request A corresponding to a requestor A, a service request B corresponding to a requestor B, a service request C corresponding to a requestor C, and a service request D corresponding to a requestor D. The service provider has arrived at a pick-up location (e.g., "Exit of Central Park North (110 St) Metro Station") to pick up the requestor A, the requestor B, the requestor C, and the requestor D. The processing engine 112 may display requestor identities (e.g., the head image A, the head image B, the head image C, and the head image D) corresponding to the requestor A, the requestor B, the requestor C, and the requestor D on the user interface 900. It may be supposed that the requestor A, the requestor B, and the requestor C have been picked up, and the requestor D has not been picked up. In order to modify the service status of the request group, the service provider may mark the requestor D (e.g., clicking the head image D) and modify the requestor statuses of the requestor A, the requestor B, and the requestor C simultaneously from not-yet-picked-up statuses to picked-up statuses by sliding a predetermined control slider "Leaving". During the sliding process, as illustrated in FIG. 9-B, FIG. 9-C, and FIG. 9-D, the head image A, the head image B, and the head image C may be enlarged and/or colored (not shown) in order from left to right, then back to original size in order. Via the sliding, the processing engine 112 may modify the provider status from an arrived status to a left status simultaneously. During the sliding process, if the service provider wishes to undo the process, as illustrated in FIG. 9-E, the service provider may slide the slider from right to left, the head image A, the head image B, and the head image C may be changed from colored to white-and-black in order from right to left. As illustrated in FIG. 9-F, until the service provider slides the slider to the right edge, the processing engine 112 may hide the head images and display a next pick-up location (e.g., "next station 5th Ave").

In some embodiments, under the same situation, in order to modify the service status of the request group, the service provider may mark the requestor A, the requestor B, and the requestor C, for example, by clicking the head image A, the head image B, and the head image C, and modify the requestor statuses of requestor A, requestor B, and requestor C simultaneously from not-yet-picked-up statuses to picked-up statuses by sliding the predetermined control slider "Leaving".

It should be noted that the operations (e.g., pressing, sliding) performed on the user interface 700, the user interface 800, or the user interface 900 by the service provider are only provided for illustration purposes, and not intended to limit the scope of the present disclosure. For ordinary person in the art, any operation (e.g., clicking, double-clicking, pulling-down) is applicable in the disclosure. Further, it should be noted that the thresholds mentioned in this disclosure may be default settings of the on-demand service system 100, or may be adjusted by a user (e.g., a requestor, a service provider).

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment," "one embodiment," or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 1703, Perl, COBOL 1702, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a software as a service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution—e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

I claim:

1. A system for displaying an identity of an online transportation service requester to a service provider, comprising:

a bus;

one or more storage media electronically connected to the bus, including a set of instructions for directing a display to display an identity relating to a service request; and logic circuits configured to communicate with the one or more storage media via the bus, wherein when executing the set of instructions, the logic circuits are directed to:

obtain first electronic signals including a target service request associated with a target transportation service from a target requestor;

determine a location of a provider, who accepts the target service request, via a GPS in a provider terminal or a driving recorder in a vehicle corresponding to the provider;

determine a path, for driving the vehicle, between a first start location of the target service request and the location of the provider on a map;

determine whether a first distance between the first start location and the location of the provider along the path is less than a first threshold;

in response to a determination that the first distance is not less than the first threshold, determine an updated location of the provider;

in response to a determination that the first distance is less than the first threshold, transmit, based on the location of the provider or the updated location of the provider, second electronic signals to the provider terminal corresponding to the provider of the target transportation service to direct the provider terminal to display an identity relating to the target service request to assist the provider to identify the target requestor, wherein on an interface of the provider terminal, the identity is highlighted, and the map showing the first start location of the target service request and the location of the provider is displayed;

track a waiting time of the provider when the provider arrives at the first start location of the target service request; and in response to a determination that the waiting time of the provider is more than a predetermined time period, direct the provider terminal corresponding to the provider to display a modifiable provider status.

2. The system of claim 1, wherein the identity relating to the target service request includes at least one of a requestor identity of the target requestor or a pick-up location identity.

3. The system of claim 2, wherein to transmit the second electronic signals to the provider terminal to direct the provider terminal to display the identity relating to the target service request, the logic circuits are directed to:
in response to a determination that the first distance is less than the first threshold, transmit the second electronic signals to the provider terminal to direct the provider terminal to display the requestor identity, wherein the requestor identity includes at least one of a name, an image, a telephone number, the first start location, or the first distance.

4. The system of claim 3, wherein the logic circuits are further directed to:
transmit third electronic signals to the provider terminal to direct the provider terminal to display a pick-up icon relating to the requestor identity;
receive fourth electronic signals including an instruction from the provider terminal when the pick-up icon is activated; and
determine the requestor is picked up based on the instruction.

5. The system of claim 4, wherein to transmit the third electronic signals to the provider terminal to direct the provider terminal to display the pick-up icon relating to the requester identity, the logic circuits are directed to:
transmit the third electronic signals to the provider terminal to direct the provider terminal to display an effect to the pick-up icon, the effect including at least one of highlighting the pick-up icon, twinkling the pick-up icon, changing a size of the pick-up icon, blurring the pick-up icon, blurring a background of the pick-up icon, or fading the background of the pick-up icon.

6. The system of claim 2, wherein to transmit the second electronic signals to the provider terminal to direct the provider terminal to display the identity relating to the target service request, the logic circuits are directed to:
obtain a plurality of candidate service requests, wherein a number of the plurality of candidate requests is greater than a second threshold value, and each candidate service request is associated with a candidate requestor from a plurality of candidate requestors;
for each candidate service request, obtain a second start location of the candidate service request;
select a set of candidate service requests from the plurality of candidate service requests to combine into a request group, wherein a second distance between any two second start locations associated with the set of candidate service requests is less than a third threshold value; and
transmit the second electronic signals to the provider terminal to direct the provider terminal to display a pick-up location identity relating to the request group.

7. The system of claim 6, wherein the pick-up location identity includes at least one of a pick-up location of the request group or the number of the set of candidate service requests in the request group.

8. The system of claim 7, wherein the pick-up location of the request group is a central location among the second start locations associated with the set of candidate service requests.

9. The system of claim 6, wherein to transmit the second electronic signals to the provider terminal to direct the provider terminal to display the pick-up location identity relating to the request group, the logic circuits are directed to:
transmit the second electronic signals to the provider terminal to direct the provider terminal to display a set of candidate requestor identities of the set of candidate service requests, wherein each candidate requestor identity is associated with a candidate service request in the request group;
generate a requestor identity group by gathering the set of candidate requestor identities of the set of candidate service requests;
transmit the second electronic signals to the provider terminal to direct the provider terminal to display an icon of the requestor identity group;
shrink the icon of the requestor identity group; and
hide the shrunk icon of the requestor identity group.

10. The system of claim 9, wherein the logic circuits are further directed to:
receive fifth electronic signals including a first instruction relating to activating at least one of a set of candidate requestor identity icons corresponding to the set of candidate requestor identities from the provider terminal;
receive sixth electronic signals including a second instruction relating to activating a predetermined control button from the provider terminal; and
determine a set of service statuses of the set of candidate service requests based on the first instruction and the second instruction, wherein the set of service statuses include a requestor status or a provider status, wherein the requestor status includes a picked-up status or a not-yet-picked-up status, and wherein the provider status includes an arrived status or a left status.

11. A method for displaying an identity of an online transportation service requester to a service provider, comprising:
obtaining, by a computer server, first electronic signals including a target service request associated with a target transportation service from a target requestor;
determining, by the computer server, a location of a provider, who accepts the target service request, via a GPS in a provider terminal or a driving recorder in a vehicle corresponding to the provider;
determining, by the computer server, a path, for driving the vehicle, between a first start location of the target service request and the location of the provider on a map;
determine, by the computer server, whether a first distance between the first start location and the location of the provider along the path is less than a first threshold;
in response to a determination that the first distance is not less than the first threshold, determining, by the computer server, an updated location of the provider;
in response to a determination that the first distance is less than the first threshold, transmitting, by the computer server, based on the location of the provider or the updated location of the provider, second electronic signals to the provider terminal corresponding to the provider of the target transportation service to direct the provider terminal to display an identity relating to the target service request to assist the provider to identify the target requestor, wherein on an interface of the provider terminal, the identity is highlighted, and the map showing the first start location of the target service request and the location of the provider is displayed;

tracking, by the computer server, a waiting time of the provider when the provider arrives at the first start location of the target service request; and in response to a determination that the waiting time of the provider is more than a predetermined time period, direct the provider terminal corresponding to the provider to display a modifiable provider status.

12. The method of claim 11, wherein the identity relating to the target service request includes at least one of a requestor identity of the target requestor or a pick-up location identity.

13. The method of claim 12, wherein the transmitting of the second electronic signals to the provider terminal to direct the provider terminal to display the identity relating to the target service request includes;

in response to a determination that the first distance is less than the first threshold transmitting, by the computer server, the second electronic signals to the provider terminal to direct the provider terminal to display the requestor identity, wherein the requestor identity includes at least one of a name, an image, a telephone number, the first start location or the first distance.

14. The method of claim 13, wherein the method further includes:

transmitting, by the computer server, third electronic signals to the provider terminal to direct the provider terminal to display a pick-up icon relating to the requester identity;

receiving, by the computer server, fourth electronic signals including an instruction from the provider terminal when the pick-up icon is activated; and determining, by the computer server, the requestor is picked up based on the instruction.

15. The method of claim 14, wherein the transmitting of the third electronic signals to the provider terminal to direct the provider terminal to display a pick-up icon relating to the requestor identity includes:

transmitting the third electronic signals to the provider terminal to direct the provider terminal to display an effect to the pick-up icon, the effect including at least one of highlighting the pick-up icon, twinkling the pick-up icon, changing a size of the pick-up icon, blurring the pick-up icon, blurring a background of the pick-up icon, or fading the background of the pick-up icon.

16. The method of claim 12, wherein the transmitting of the second electronic signals to the provider terminal to direct the provider terminal to display the identity relating to the target service request includes:

obtaining, by the computer server, a plurality of candidate service requests, wherein a number of the plurality of candidate requests is greater than a second threshold value, and each candidate service request is associated with a candidate requestor from a plurality of candidate requesters;

for each candidate service request, obtaining, by the computer server, a second start location of the candidate service request;

selecting, by the computer server, a set of candidate service requests from the plurality of candidate service requests to combine into a request group, wherein a second distance between any two second start locations associated with the set of candidate service requests is less than a third threshold value; and transmitting, by the computer server, the second electronic signals to the provider terminal to direct the provider terminal to display a pick-up location identity relating to the request group.

17. The method of claim 16, wherein the pick-up location identity includes at least one of a pick-up location of the request group or the number of the set of candidate service requests in the request group.

18. The method of claim 17, wherein the pick-up location of the request group is a central location among the second start locations associated with the set of candidate service requests.

19. The method of claim 16, wherein the transmitting of the second electronic signals to the provider terminal to direct the provider terminal to display the pick-up location identity relating to the request group includes:

transmitting, by the computer server, the second electronic signals to the provider terminal to direct the provider terminal to display a set of candidate requestor identifies of the set of candidate service requests, wherein each candidate requestor identity is associated with a candidate service request in the request group;

generating, by the computer server, a requestor identity group by gathering the set of candidate requestor identities of the set of candidate service requests;

transmitting, by the computer server, the second electronic signals to the provider terminal to direct the provider terminal to display an icon of the requestor identity group;

shrinking, by the computer server, the icon of the requestor identity group; and hiding, by the computer server, the shrunk icon of the requestor identity group.

20. The method of claim 19, wherein the method further includes:

receiving, by the computer server, fifth electronic signals including a first instruction relating to activating at least one of a set of candidate requestor identity icons corresponding to the set of candidate requestor identities from the provider terminal;

receiving, by the computer server, sixth electronic signals including a second instruction relating to activating a predetermined control button from the provider terminal; and determining, by the computer server, a set of service statuses of the set of candidate service requests based on the first instruction and the second instruction, wherein the set of service statuses include a requestor status or a provider status, wherein the requester status includes a picked-up status or a not-yet-picked-up status, and wherein the provider status includes an arrived status or a left status.

* * * * *